Jan. 5, 1965   SEITARO INOUYE   3,164,653
METHOD OF TUMBLE MOLDING
Filed Aug. 3, 1962
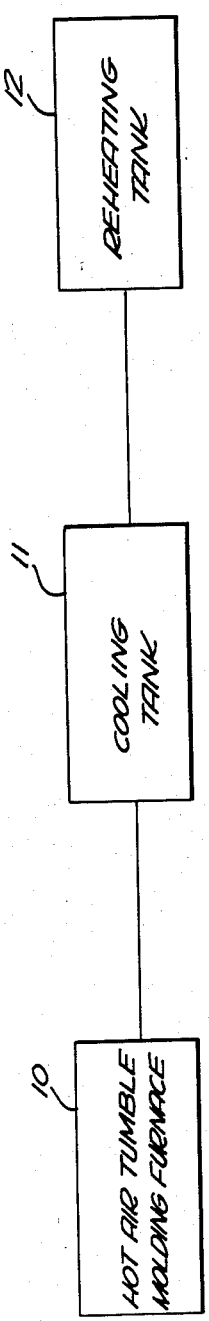
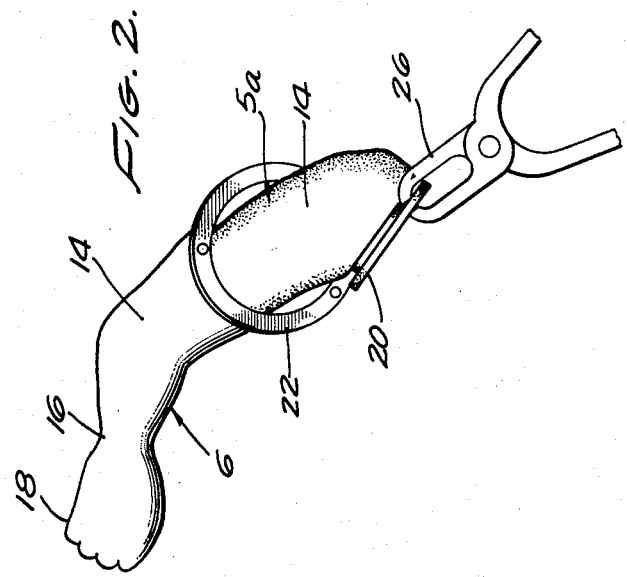
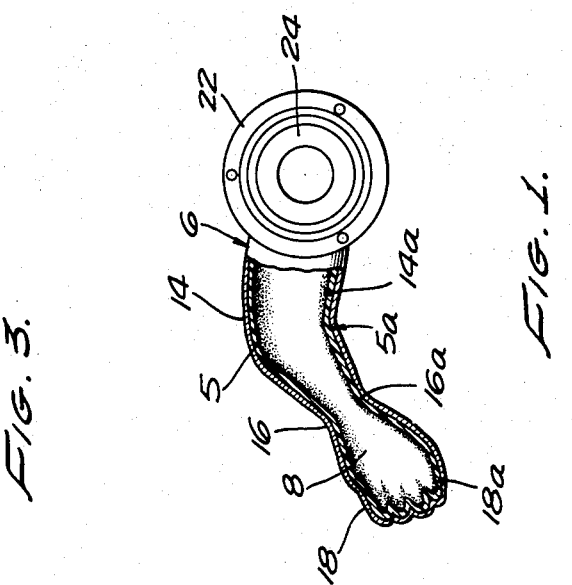
INVENTOR.
SEITARO INOUYE
BY
*Albert M. Herzog*
ATTORNEY

United States Patent Office 3,164,653
Patented Jan. 5, 1965

3,164,653
METHOD OF TUMBLE MOLDING
Seitaro Inouye, 39 Shiba-Shirokane Sarumachi,
Minato-ku, Tokyo, Japan
Filed Aug. 3, 1962, Ser. No. 214,553
Claims priority, application Japan, June 9, 1962,
37/23,698
3 Claims. (Cl. 264—310)

This invention relates to an improved method for producing articles from a thermoplastic material, and particularly to a tumbling or rotational-type molding method for for producing articles having superior characteristics.

Many articles, such as limbs for dolls, are made from thermo-plastic material in accordance with a process or method of molding known generally as "tumble molding" or "rotational molding." In such a process, a quantity of the molding material is placed in a unitary closed mold without parting lines or parts, and the mold is placed within an oven. Due to the heat and the motion, the material within the mold is formed to the shape of the mold and is "cured," that is, undergoes changes whereby it hardens or solidifies to a degree into the form or shape of the mold, so that when it is subsequently removed from the mold it will retain the desired shape. Then, according to conventional practice, the mold and the molded article are cooled and the article is removed from the mold. Customarily the molded parts have been cooled from "curing" temperature directly down to a removal temperature of 120° F. or less and are then removed from their mold.

The parts produced by this method have not been entirely satisfactory however. They are frequently too rigid, hard or non-pliable with too little elastic memory, or of too low tensile strength. This is true both from the standpoint of the finished article, and also in terms of the removal of the article from the mold without deforming, breaking or otherwise damaging the article. As to the finished product, it is desirable that it combine high strength and elastic memory with pliability or flexibility. This is particularly desirable in children's dolls which will be subjected to considerable rough treatment.

A more serious problem is presented in providing a suitable finished product which during its production may be removed from its mold without an excessive amount of breaking or deformation. If the article does not possess enough strength when it is removed from the mold, it may permanently stretch, deform or break. On the other hand, if the article is hardened to too great a degree when it is attempted to be removed from the mold, damage such as breaking or marring may also result when the part is forced from the mold.

These problems are particularly present in the formation of certain articles of irregular or varied shape which must be compressed or somewhat deformed in passing through restricted portions of the mold incident to removal of the article from the mold. For example, the arm or leg of a doll presents such a situation. The hands and feet of the doll are relatively large as compared to the associated wrists and angles. The arms and legs themselves are also relatively large as compared to the wrists and ankles, and it is therefore preferable that the hands and feet be formed at the innermost recess of the mold cavities so that, for example, a hand rather than an entire arm need pass through the restricted portion or section of the mold forming the wrist.

Heretofore, often the relatively large hand, foot or other part was not sufficiently soft, pliant or flexible to permit the necessary temporary reduction in size and/or change in shape incident to its withdrawal or passage through the restricted mold sections defining the wrist, ankle or the like. Also the parts were frequently of too low tensile strength or of too little elastic memory. As a result the narrower parts, i.e., wrist ankle, etc., would break or permanently deform when the hand, foot or the like was pulled through the restricted mold section, or the enlarged part itself was permanently deformed or marred by virtue of being pulled through that restricted section.

If the molded article is merely removed at a higher temperature to make the enlarged hand or foot softer and more pliable, often the articles of the prior art have not had sufficient strength and elastic memory to prevent stretching or permanent deformation of the article as it is pulled from the mold. On the other hand, if the temperature of removal is lowered to impart greater hardness and tensile strength to the article, the enlarged hands and feet will provide increased resistance to their removal through the narrowed sections of the mold, and removal of the part from the mold will tend to result in damage to the molded article and in particular in an excessive amount of breaking and deformation at the narrower portions, e.g., wrists or ankles.

The present invention derives from the discovery that products with improved characteristics of toughness, resilience and pliability can be achieved by curing the article, cooling it to a temperature substantially below the heretofore feasible temperature for the removal of the molded article from the mold without damaging or deforming it, and then reheating the article at least to an elevated temperature above normal room temperature higher than such cooling temperature but lower than the curing temperature, to facilitate its removal from the mold. The initial cooling toughens or strengthens the article and the improved characteristics are retained after the subsequent reheating operation. The articles are removed from the mold at about that reheat temperature. The resultant formed articles have enhanced elastic memory and strength.

In the stage of reheating the parts become softened or more pliable, yet retain sufficient strength so that they may be readily removed from the mold without damage. In particular the enlarged portions of the parts may be pulled through the restricted areas of the mold without permanent damage to them and without breaking or deforming the narrowed wrists or ankles of the parts. The cooled finished product also has high tensile strength combined with high elastic memory and resiliency.

Accordingly, it is a prime object of the present invention to provide an improved molding method. More specifically, it is an object of the present invention to provide a rotational-type unitary or closed-cavity molding method wherein the cured and molded articles are cooled to a temperature, after which the article is reheated to produce a molded article having desirable strength and resiliency characteristics to permit ready stripping or withdrawal of the product from the mold with all of its parts, especially feet, hands and the like enlarged parts, intact.

Various other objects and advantages of the present invention will become obvious from the following description and the accompanying drawings, wherein in the drawings:

FIGURE 1 is a perspective view, with parts broken away and in section, showing a mold for a doll's arm such as may be used in the practice of the method of the present invention and a molded doll's arm within said mold;

FIGURE 2 is a perspective view showing the completed arm being removed from the mold; and FIGURE 3 is a diagrammatic representation of apparatus for practicing a rotational molding process embodying various features from the present invention.

Briefly, according to the method illustrated in the drawings, a quantity of the material 5 in a liquid state is placed within a unitary closed mold 6 which is sealed. The mold 6 is then placed within a furnace 10 where it is rotated in several planes and subjected to the heat of the furnace. The molding material 5 is thus caused to assume the shape of the interior of the mold 6 and to "cure" or set into the desired shape, thus providing the molded article 5a. The mold is then removed from the heating furnace and cooled in a cooling tank 11 to bring the temperature of the molded article 5a substantially to about ambient temperature and a solid state. The mold 6 and the article 5a are then reheated in another tank 12 to raise the temperature of the article, prefreably at least to that normal removal temperature or to a higher temperature, to facilitate removal of the article, and, while at about that temperature, the molded article is removed from the mold.

More particularly, a quantity of a suitable material 5 of the type which will fuse at an elevated temperature is placed in the mold 6. The process of the invention may be used advantageously with a plastisol formulation which will normally include a substance such as polyvinyl chloride resin, a plasticizer, a stabilizer, a filler and a pigment. Such a material, prior to being used in the process, will be in a liquid state at ambient or room temperature and may be conveniently placed in the mold in that state and at room temperature.

FIGURES 1 and 2 show a mold which may be used in practicing the method of the invention. The illustrated mold 6 is for forming the arm and hand of a child's doll, but obviously the method of the present invention is equally applicable to other shapes and forms.

The illustrated mold 6 is an elongated hollow shell or form which is closed at one end and open at the other end. The mold 6 is of the closed mold-type, that is, it has a continuous or seamless interior surface as distinguished from a mold having a seam or parting line connecting several sections from which the mold is comprised. This type of mold will produce a molded article which has a correspondingly continuous or seamless surface. The inner surface of the mold 6 defines a cavity 8 in the shape of the object or article 5a to be molded: in this case the cavity includes a doll's elongated arm section 14, a wrist section 16 of reduced cross section, and an enlarged hand section 18. The hand section 18 is at the closed end of the mold 6, with the contracted wrist section 16 adjacent thereto, and the elongated arm section 14 leading toward the open end of the mold 6. As seen in FIGURE 1, the molded article 5a is formed with arm, wrist and hand portions 14a, 16a, and 18a, respectively, corresponding to the sections 14, 16 and 18 of the mold 6. As seen in that figure, the enlarged hand portion 18a must be capable of passing through the restricted wrist section 16 of the mold when the molded article 5a is removed from the mold.

The illustrated mold 6 is also formed adjacent its open end to provide a flange portion 20 at the upper end of the arm portion 14a of the molded article 5a (FIGURE 2). This flange portion 20 facilitates the removal of the article 5a from the mold 6, and may also provide means for connecting the molded doll's arm to the body of the doll.

The illustrated mold 6 also has an outwardly extending circumferential flange 22 located at its open end. The flange 22 permits handling of the mold 6 during the various steps of the process and in particular facilitates mounting the mold to the rotating equipment (not shown) of the heating furnace 10. The mold 6, as shown in FIGURE 1, is also provided with a cover 24 for sealing the mold shut after the material 5 has been placed into it.

After it is sealed, the mold 6 is placed into the heating or "curing" furnace 10 which is illustrated diagrammatically in FIGURE 3 and may be of any suitable commercial design. The furnace 10 includes means (not shown) for rotating the mold 6 in two different planes. The motion of the mold causes the material to take on the shape of the interior of the mold. In the illustrated example, as shown in FIGURE 1, the material takes on the shape of the doll's arm defined by mold 6, forming a thin continuous coating over the interior of the mold. Thus, in the example a hollow shape is produced and as the method of the invention is particularly advantageous when used with molded objects of such relatively delicate construction, the description has been directed to such an example. It is to be understood, however, that the process is also applicable in the production of objects of other shapes including solid objects.

The elevated temperature of the furnace 10 raises the temperature of the material 5 within the mold to its "curing" or "fusing" temperature. This curing is at least partial pre-setting by thermal means of characteristics of the finished molded object; the physical and chemical character of the material is changed in such a way as to at least partially predetermine or preset characteristics such as strength and memory of the finished molded article. The hollow object or article 5a which is thus provided is in the form of an extremely hot solid that has a defined shape and boundary, but which very readily stretches or deforms.

In the illustrated process, the mold 6 containing the molded article 5a is then cooled as by removing it from the furnace 10 and placing it in the cooling tank 11 which also may be of any suitable commercial design. As the article 5a cools it becomes more set or fixed in its shape. It also undergoes a certain toughening or strengthening. The molded article 5a is cooled down to a temperature substantially below the normally feasible removal temperature. This normal feasible removal temperature is the lowest temperature at which the molded article would ordinarily or normally be removed from the mold because a lower temperature would so solidify or harden it that there would be a substantial risk of deforming or damaging it in the act of removing it from the mold. At this lowered temperature, substantially below the removal temperature, the molded article does in fact become relatively hardened and rigid and may not be readily removed from the mold without the risk of damage or deformation. This is particularly so with regard to the removal of an article such as the doll's arm 5a illustrated in the drawing as the enlarged hand portion 18a must pass through the restricted wrist section 16 and the thinner or narrower wrist portion 16a of the article 5a must withstand the forces on the molded article necessary to accomplish that removal of the hand portion 18a. The molded article 5a is not removed from the mold at this lowered temperature, but rather, this cooling is used to improve the characteristics such as strength, toughness and resiliency of the article at the removal stage to facilitate its extraction from the mold, and also in the finished product.

After this cooling, the mold 6 is then reheated. As illustrated in FIGURE 3, the mold 6 of the example goes to the reheating tank 12. The temperature of the molded article 5a within the mold is raised to preferably at least about the normally feasible removal temperature, the mold is removed from the reheating tank, and the molded article 5a is removed from the mold while at substantially the raised reheat temperature.

This reheating tends to soften the article and make it more pliable so as to facilitate its removal from the mold, and yet the article has also been found to have better associated strength characteristics, i.e., higher tensile strength, superior elastic memory, improved resistance to permanent deformation and to marring, than if it had been brought directly to that reheat temperature rather than initially cooled and subsequently reheated in accordance with the method of the invention. Thus, the removal of the article from the mold is facilitated, and the chance of it being deformed, scarred, chipped or the like while it is being removed is low.

As shown in FIGURE 2, after the cover 24 has been removed, the illustrated article 5a in the form of a doll's arm and hand is removed as by gripping the flange portion 20 of the article with a pliers 26 or other suitable holding means and pulling axially or outwardly to draw the elongated article out through the open end of the mold 6. As noted above, the enlarged hand portion 18a must pass through the restricted opening of the wrist section 16 of the mold. The hand portion 18a must be sufficiently flexible to permit this removal while the thin wrist portion 16a must be strong or tough enough to withstand the forces on it without breaking or permanently deforming. The hand portion 18a must be resilient, flexible yet tough enough to return to its original shape after being forced through the restricted wrist section 16. These requirements or characteristics are adequately provided in the article produced by the method of the invention so that the illustrated doll's arm may be removed from the mold with no substantial deformation, marring, or the like.

When the molded article 5a cools to the ambient temperature, it is found to have improved characteristics over similar articles produced other than by the claimed method. In particular, the finished article 5a combines high tensile strength with a high modulus of elasticity to provide a product which will "give" but which will not easily tear, break, deform, chip or mar. These are particularly desirable characteristics for children's dolls, which tend to be turned, twisted, pulled and the like.

The process of the invention has been found to work effectively with a plastisol formulation including polyvinyl chloride resin, a plasticizer, a stabilizer, a filler, and a pigment. Using such a material, the mold is heated to raise the temperature of the material to a curing temperature which is in the range of from about 275° F., to about 375° F. The temperature of the molded article is then lowered to a temperature in the range from about 97° F., to about 87° F. This cooling is accomplished in about one minute. The material is then reheated to from about 120° F., to about 130° F., or even higher, and the molded article is removed from the mold at about that reheat temperature. The article, both during removal and after final cooling, is found to have highly satisfactory strength, elastic memory, flexibility and the like.

The particular example described herein and illustrated in the drawings is merely illustrative of the method of the invention and various changes or modifications may be made in said example without departing from the spirit and scope of the invention.

Various features of the present invention are set forth in the following claims.

What is claimed is:

1. A method for making articles from a thermoplastic material comprising the steps of: placing a quantity of such material in a mold, heating and rotating the mold for a sufficient length of time and in several different planes to permit the material due to the motion and the elevated temperature to take the shape of the mold and be cured within the mold into an article of relatively determined dimensions, cooling the mold to lower the temperature of the molded article in the mold to substantially ambient temperature and solid state and reheating the mold to raise the temperature of the article to at least about that temperature at which it begins to soften, and removing the molded article from the mold while at said reheated temperature.

2. A method for making articles from a thermoplastic such as a plastisol formulation of the kind normally including polyvinyl chloride resin, a plasticizer, a stabilizer, a filler, and a pigment, said method comprising the steps of: placing a quantity of such material within a mold, heating the mold and rotating it in several different planes for a sufficient length of time to permit the material due to the motion and elevated temperature to take the shape of the mold and be cured into an article of relatively fixed dimensions having that shape, cooling the mold to lower the temperature of the article to a temperature in the range from about 87° F., to about 97° F., reheating the mold to raise the temperature of the article to at least about 120° F., and removing the article from the mold while it is at about that 120° F., temperature.

3. A method of molding particularly adapted to producing molded articles in a unitary closed mold which defines a cavity having restricted section between its open side and a section which is enlarged relative to the restricted section, whereby the portion of the molded article formed by the enlarged section must pass through the restricted section of the mold incident to the removal of the molded article from the mold, said method comprising the steps of placing a quantity of a thermoplastic material in one of the molds, forming and heating the material within the mold to form a cured article of relatively determined dimensions coinciding generally with the cavity of the mold, cooling the formed article to substantially ambient temperature and solid state, and reheating the article to at least about that temperature at which it begins to soften and removing the molded article from the mold while at said reheated temperature.

References Cited in the file of this patent

UNITED STATES PATENTS

| | | |
|---|---|---|
| 667,600 | Stevens | Feb. 5, 1901 |
| 1,916,692 | Scribner | July 4, 1933 |
| 2,476,710 | Eaton | July 19, 1949 |
| 3,044,124 | Valentine | July 17, 1962 |